United States Patent [19]
Ryland

[11] 3,852,894
[45] Dec. 10, 1974

[54] PORTABLE ELECTRIC QUIZ ANNUNCIATOR

[76] Inventor: Earvin Ryland, 904 Sherwood Dr., Ruston, La. 71270

[22] Filed: Jan. 29, 1973

[21] Appl. No.: 327,443

[52] U.S. Cl. ............................................... 35/48 R
[51] Int. Cl. ............................................. G09b 5/00
[58] Field of Search ............ 35/9 R, 9 B, 9 C, 48 R; 273/123

[56] References Cited
UNITED STATES PATENTS

| | | | |
|---|---|---|---|
| 2,562,179 | 7/1951 | Dorf | 35/48 R |
| 2,654,163 | 10/1953 | Reynolds | 35/48 R |
| 2,860,422 | 11/1958 | May | 35/9 C |
| 3,763,577 | 10/1973 | Goodson | 35/48 R |

OTHER PUBLICATIONS

Build with IC's "Electronic Umpire," by E. Miller, Radio Electronics, pg. 46–47, Dec. 1970.

*Primary Examiner*—John H. Wolff
*Attorney, Agent, or Firm*—Shlesinger, Arkwright, Garvey & Dinsmore

[57] ABSTRACT

A portable electric quiz annunciator comprising a housing including front, rear and bottom walls and having easy access means to the interior thereof, the rear wall including a plurality of manually operable horizontally aligned switch means externally mounted thereon, a plurality of light means supported by the housing, circuit means in the housing for connecting the switch and light means to a source of power and including means for activating one of the light means and simultaneously rendering the remaining light means inoperable, the front wall including horizontally aligned means for viewing from outside of housing each of the light means, and handle means on the housing for carrying the device.

1 Claim, 5 Drawing Figures

PORTABLE ELECTRIC QUIZ ANNUNCIATOR

SUMMARY OF THE INVENTION

This invention related to an annunciator for use in game or teaching situations where a number of contestants or students are simultaneously asked a question to be answered only by the contestant or student who is capable of responding first. Readiness to respond is communicated to the teacher or audience by the student's closing the particular switch assigned to him. This activates a visual signal assigned to the aforementioned student and renders the signals assigned to the other contestants inoperable.

BACKGROUND OF THE INVENTION AND OBJECTS

Many educational and entertainment situations involve a single person attempting, either through words or actions, to invoke a desired response from any one of a group of persons, probably the most frequent example of this type of situation occurs in various quiz programs where more than one contestant is asked a question by the master of ceremonies and the first one to answer the question correctly receives a prize, a certain number of points etc. Another context in which the aforementioned situation can arise is in the classroom where the teacher is attempting to make the students think by creating an air of competition. This is achieved in much the same manner as in the quiz program, viz, asking the students a question and permitting that student who first believes he knows the answer to respond to the question.

To effectively conduct such a quiz or teaching situation, it is necessary that means be provided to indicate which student or contestant has first formulated an answer. Apparatus capable of accomplishing this are known. For example, Reynolds U.S. Pat. No. 2,654,163, discloses an automatic quiz show indicator which registers and displays the first one of a plurality of contestants who first obtain the correct solution for a group of questions or problems. A substantial drawback to the prior art devices, however, lies in the fact that they are not adapted to be used in a variety of situations where portability, ease in set up, widely varied application and ease in mainteance are desirable. These kind of characteristics are essential in any device used by teachers and others for a great variety of purposes and in numerous situations. Any inherent use limiting features of a teaching or game device tend to lessen its versatility and, consequently, make it unattractive in circumstances where space and financial requirements dictate the use of compact low-cost equipment capable of being employed in the greatest number of situations. The potential market for such a teaching device includes schools, church groups, youth organizations and other groups which engage in activities covering a very broad spectrum.

It is, therefore an object of this invention to provide a portable electric quiz annunciator which is uncomplicated to operate both by the contestants and the teacher.

It is a further object of this invention to provide a portable electric quiz annunciator having contestant-operated switches on one panel and teacher or audience visible signal lights on an opposite panel.

A further object of this invention is to provide a portable electric quiz annunciator including horizontally aligned contestant operated switches and lights interconnected by circuit means which activate that light corresponding to the first-actuated switch.

A still further object of this invention is to provide a portable electric quiz annunciator which is compact.

Yet another object of this invention is to provide a portable electric quiz annunciator which is self contained and may be set up for use simply by plugging it into a regular electric wall outlet.

Yet a further object of this invention is to provide a portable electric quiz annunciator having a design which renders it capable of being used in a wide variety of situations without the necessity of having or deleting any components or making internal adjustments.

These and other objects of this invention will be apparent from the following description and claims.

In the accompanying drawings which illustrate this invention:

Figure 1:
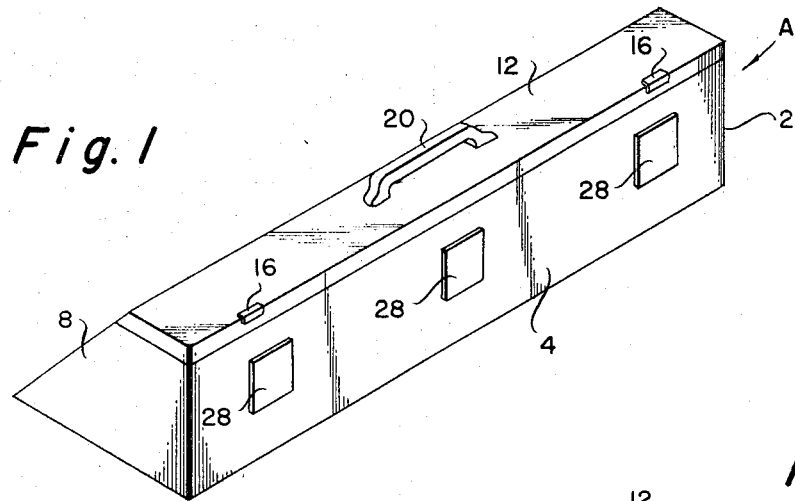
FIG. 1 is a front perspective view of the invention showing the indicating panel.
Figure 2:
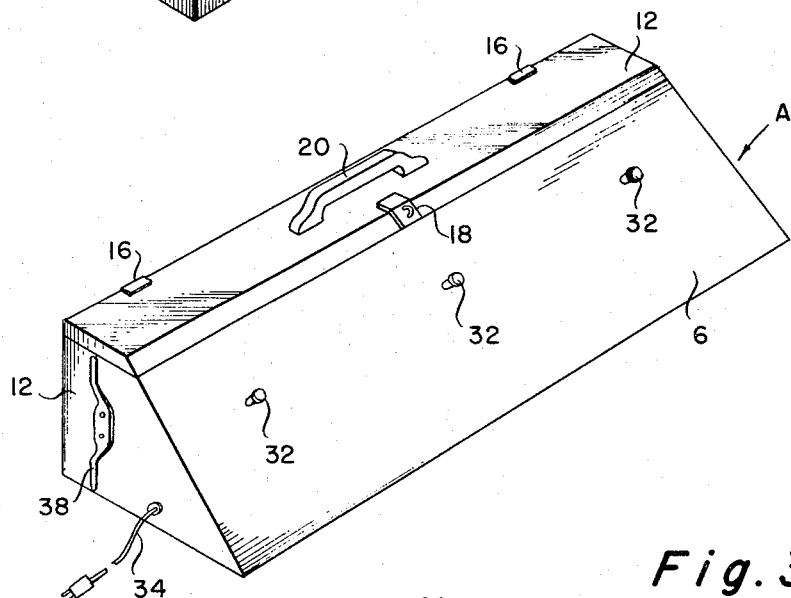
FIG. 2 is a rear perspective view of the invention showing the contestant-operated switch panel.
Figure 3:
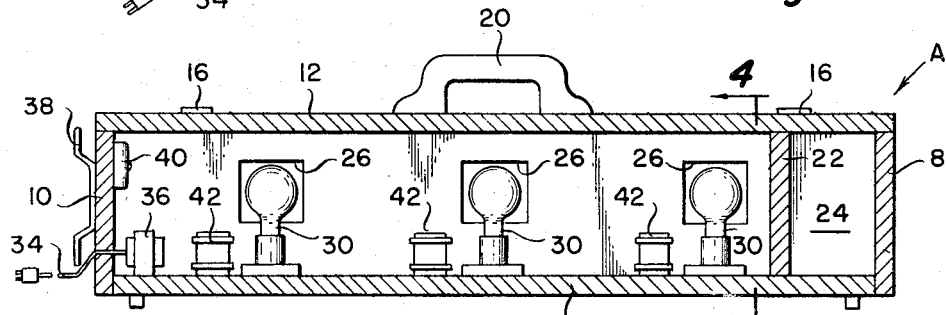
FIG. 3 is an elevational view in section illustrating the internal design of the invention.
Figure 4:
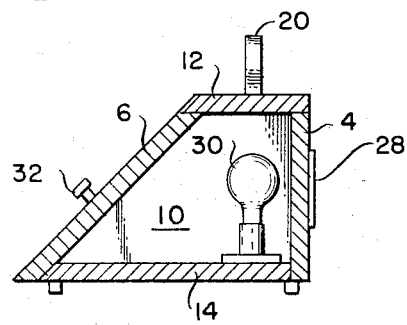
FIG. 4 is a side elevational view in section.

The quiz annunciator A has an outer cabinet 2 including a front panel or wall 4, a rear switch panel 5, side panels 8 and 10, a top panel 12 and a bottom panel 14. Top panel 12 is provided with hinges 16 and a latch 18 to provide easy access to the interior thereof so that mainteance operations may be preformed. Mounted on top panel 12 is a handle 20 which permits the cabinet 2 to be easily hand carried. Partition 22 transverses the internal width and height of cabinet 2 so as to form a storage compartment 24 for spare parts, teaching materials etc.

Front panel 4 is provided with three apertures 26 having overlying translucent panes 28. Lamps 30 are mounted within cabinet 2 behind apertures 26 so that light emitted by them when they are actuated will pass through translucent panes 28 and be visible to the teacher or audience. While it is preferred that lamps 30 be mounted within cabinet 2 so as to provide protection from breakage, it is obvious that it could be mounted externally on front panel 4.

Three momentarily push-button switches are mounted on the external surface of rear panel 6. Switches 32 are horizontally aligned to correspond with apertures 26 and lamps 30 so that if each of the three contestants is positioned behind one of the switches 32, it will be readily apparent to the audience or teacher who has caused the lamp to be activated. To permit the contestants to depress their respective switches 32 with ease, rear panel 6 is inclined with respect to the horizontal rather than being at right angles thereto.

Power is supplied to the annunciator A by means of power cord 34 and transformer 36. Power cord 34 may be wound on reel 38 when not in use. Transformer 36, lamps 30, buzzer 40 and relays 42 may be mounted on the internal walls of cabinet 2 in any suitable manner.

FIG. 5

Figure 5:
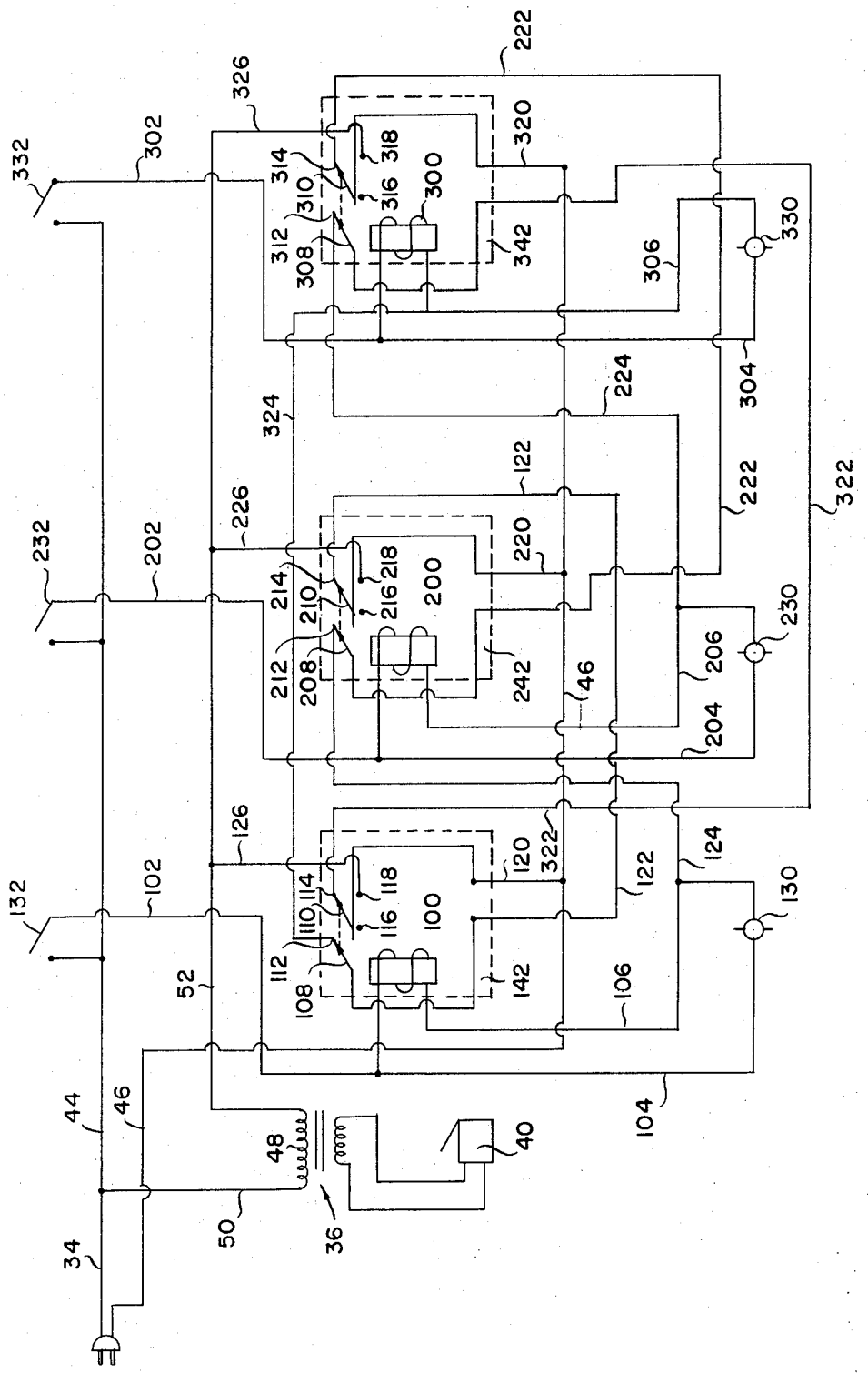
FIG. 5 is a schematic diagram of the circuit for indicating which of the contestants has been the first to respond.

FIG. 5 illustrates the manner in which the switches 32, lamps 30, buzzer 40 and power cord 34, shown generally in FIGS. 1 through 4, are interconnected.

Power cord 34 connects to conductors 44 and 46, shown as busses, to supply current to lamps 130, 230, and 330 and relays 142, 242, and 342. Conductor 44 is selectively connected to lamp-relay coil pairs 100 – 130, 200 – 230, 300 – 330 by switches 132, 232, 332 and conductors 102, 202, 302, respectively. Lamps 130, 230 and 330 are connected in parallel across coils 100, 200 and 300 by conductor pairs 104 – 106, 204 – 206 and 304 – 306, respectively.

Relays 142, 242 and 342 are double pole - double throw relays which, when in their normally "closed" positions, are as shown in FIG. 5. Relay 142 includes movable armatures 108 and 110 which move simultaneously from contacts 112 and 114 to contacts 116 and 118, respectively, when current flows through coil 100. Relay 242 includes movable armatures 208 and 210 which are capable of simultaneous movement from contacts 212 and 214 to contacts 216 and 218, respectively, when current flows through coil 200. Similarly, relay 342 has a pair of movable armatures 308 and 310 which move simultaneously from contacts 312 and 314 to contacts 316 and 318, respectively, when current flows through coil 300.

Armatures 110, 210 and 310 are connected to conductor 46 through conductors 120, 220 and 320, respectively. Armature 108 is connected to contact 214 through conductor 122; armature 208 is connected to contact 314 through conductor 222; and armature 308 is connected to contact 114 through conductor 322. Coil 300 is in series with normally closed armature 108 through conductor 324 and contact 112; coil 200 is in series with normally closed armature 308 through conductor 224 and contact 312; and coil 100 is in series with normally closed armature 208 through conductor 124 and contact 212.

As well as applying lamp and relay current as previously described, conductor 44 powers buzzer 40 through transformer 36. Conductor 44 is connected to transformer primary 48 through conductor 50 which in turn is connected to conductor 52. A return path for buzzer current is provided by one of the conductors 126, 226 or 326 in conjunction with contacts 118, 218 and 318, respectively.

OPERATION

The quiz annunciator operates as follows:

Two or more contestants (three contestants maximum in the embodiment shown) sit behind the annunciator A facing panel 6 and switches 32. In response to a question or other stimulus, each contestant signals his readiness to respond by depressing the particular switch 32 assigned to him. Due to the circuitry interconnecting the switches 32, lamps 30 and buzzer 40, the only lamp 30 which will be illuminated is that one aligned with the switch 32 which depressed first. The buzzer 40 will be sounded simultaneously with the activation of one of the lamps 30. In this manner, the particular contestant first signaling his readiness to respond will be indicated by an illuminated lamp in front of his position.

The circuitry (FIG. 5) functions as follows:

When one of the switches, e.g., 132, is closed, current will flow from conductor 44 through conductor 102, coil 100 and lamp 130, conductor 124, normally closed armature 208, conductor 222, normally closed armature 310 and conductor 320 to conductor 46 thereby completing the circuit. The completion of this circuit illuminates the lamp 130 and activates coil 100 so that armatures 108 and 110 move from contacts 112 and 114 to contacts 116 and 118, respectively. The circuit comprising conductors 44 and 50, primary coil 48, conductors 52 and 126, contact 118, armature 110 (now in the "open" position), conductor 120 and conductor 146 now being completed, the buzzer 40 will sound.

Should either of switches 232 or 332 later be closed while switch 132 remains closed, neither lamp 230 nor lamp 330 will be illuminated. This is borne out by a circuit continuity analysis from conductor 44 to conductor 46 through either switch 232 or 332.

Considering first switch 232, the partial circuit includes conductor 44; switch 232; conductor 202; the parallel circuit comprising conductors 204 and 206, lamp 230 and coil 200; conductor 224; armature 308; conductor 322 and contact 114. The circuit is broken at contact 114 since armature 110 is in its "open" position (i.e., in contact with contact 118) due to the current passing through coil 100 thereby preventing the illumination of lamp 230.

Considering now switch 332, the partial circuit for lamp 330 includes conductor 44; switch 332; conductor 302; the parallel circuit comprising coil 300, lamp 330 and conductors 304 and 306; conductor 324 and contact 112. This circuit is broken at contact 112 since armature 108 is in its "open" position (i.e., in contact with contact 116) and lamp 330 can not be illuminated.

A similar analysis of circuit continuity when either switch 232 or switch 332 is closed first will reveal that only the lamp corresponding to that switch which is closed first in time will be illuminated. Also, only that switch which is first closed will control the sounding of common buzzer 40.

The following represents a list of elements which can be successfully employed in the above-described invention: transformer 36: 115 V.A.C., 10 A. primary; 12 V.A.C. secondary switches 132, 232 & 332: 115 V.A.C., 10 A. momentary switch relays 142, 242 & 342: 115 V.A.C., 5 A. DPDT relay lamps 130, 230 & 330: 115 V.A.C., 15 watt light bulbs buzzer 40: 12 V.A.C. buzzer.

While this invention has been described as having a preferred design, it will be understood that it is capable of further modification. This application is, therefore, intended to cover any variations, uses, or adaptations of the invention following the general principles of this invention and including such departures from the present disclosure as come within known or customary practice in the art to which this invention pertains, and as may be applied to the essential features hereinbefore set forth and fall within the scope of this invention or the limits of the appended claims.

I claim:

1. A portable, self-contained electric quiz annunciator adapted to be placed on a table or the like comprising:
   a. an elongated housing including a front wall, a rear wall opposite said front wall and a top wall positioned between said front and rear walls,
   b. said rear wall sloping away from said top wall,
   c. said housing being of a size and shape permitting a plurality of competing contestants to be observed from a position in front of said housing when sitting behind same, d. said housing including a compartment adapted to store associated paraphernalia, e. handle means for carrying said annunciator secured to said top wall, f. means associated with one of said walls to permit said last mentioned wall to be opened thereby permitting access to the interior of said housing, g. a plurality of longitudinally aligned light means supported within said housing for indicating when each contestant has answered, h. said front wall including means for viewing from outside said housing said plurality of light means, i. said means for viewing including a plurality of longitudinally aligned apertures in said front wall, j. a plurality of longitudinally aligned contestant operated switches mounted externally on said rear wall and arranged to permit a single contestant to be seated behind each of said switches, k. said plurality of switches, light means and apertures being aligned from front to rear such that individual ones of said plurality of switches are positioned directly behind individual ones of said plurality of light means and apertures to thereby visually associate each of said plurality of light means with a particular contestant, l. circuit means mounted within said housing for interconnecting said plurality of switches, said plurality of light means and a source of power to activate one of said plurality of light means upon the closing of that one of said plurality of switches positioned behind said last mentioned one of said plurality of light means and simultaneously render the others of said plurality of light means inoperable when said last mentioned one of said light means is activated, and m. an electrically operated buzzer supported within said housing, n. said circuit means including means for activating said buzzer simultaneously with the activation of said one of said light means to emphasize the fact that a contestant has answered.

* * * * *